April 3, 1951 B. B. LOVELESS ET AL 2,547,332
DEVICE FOR STARTING RACES
Filed Sept. 23, 1949 4 Sheets-Sheet 1

INVENTORS.
RICHARD J. ALHAND, BASIL S. SAMPLE
BOYD B. LOVELESS
BY Kenneth Swartwood
ATTORNEY April 3, 1951  B. B. LOVELESS ET AL  2,547,332
DEVICE FOR STARTING RACES
Filed Sept. 23, 1949  4 Sheets-Sheet 2
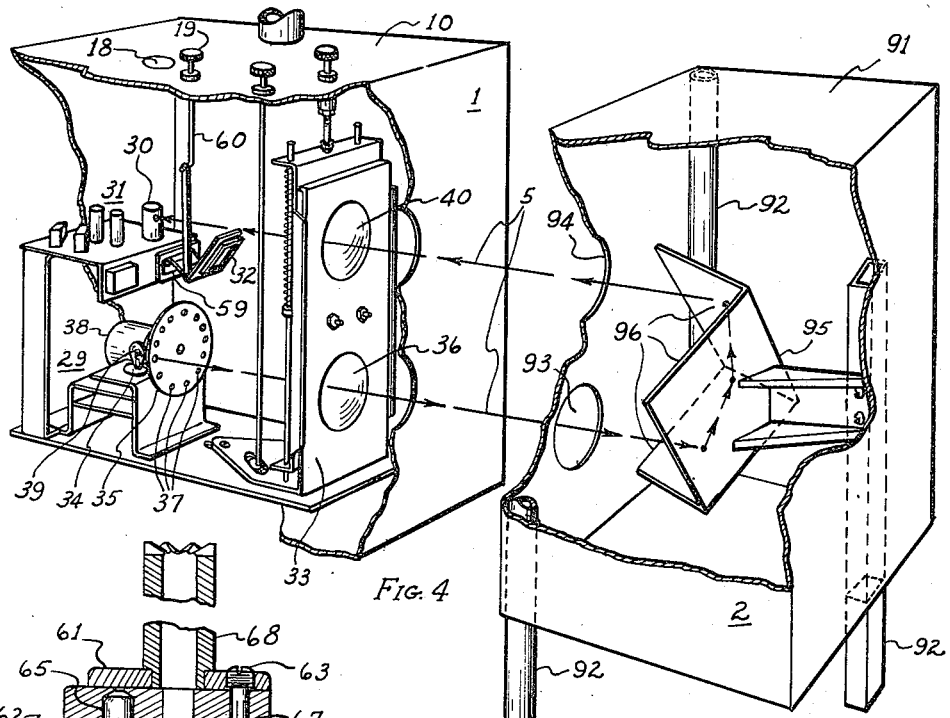
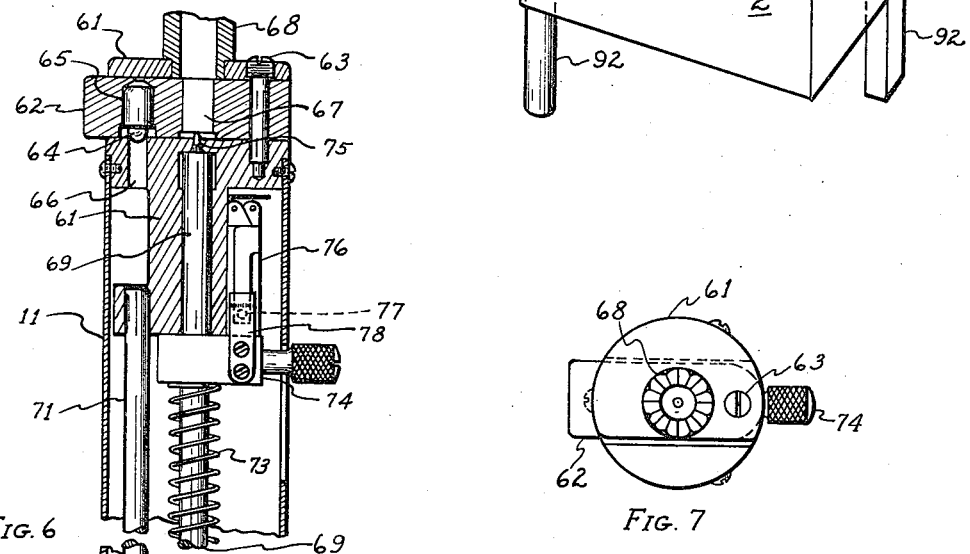
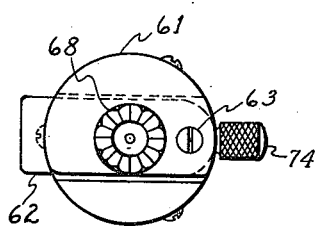
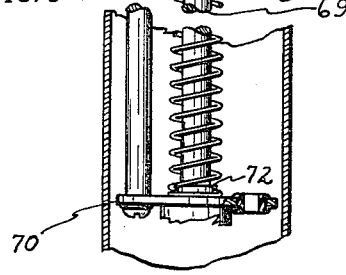
INVENTORS
RICHARD J. ALHAND, BASIL S. SAMPLE
BOYD B. LOVELESS
BY Kenneth Swartwood
ATTORNEY April 3, 1951  B. B. LOVELESS ET AL  2,547,332
DEVICE FOR STARTING RACES Filed Sept. 23, 1949  4 Sheets-Sheet 3

INVENTORS
RICHARD J. ALHAND, BASIL S. SAMPLE
BOYD B. LOVELESS
BY Kenneth Swartwood
ATTORNEY Patented Apr. 3, 1951

2,547,332

UNITED STATES PATENT OFFICE 2,547,332

DEVICE FOR STARTING RACES

Boyd Bryan Loveless, Richard Jackson Alhand, and Basil Stafford Sample, Danville, Ill., assignors to Electric Eye Equipment Company, Danville, Ill., a corporation of Delaware Application September 23, 1949, Serial No. 117,414

1 Claim. (Cl. 177—384)

This invention relates to detectable signals for use in the starting of foot races of various sorts, swimming races, and any other such event in which accurately timed starting signals are required.

Many times, important potential record performances and important races have been lost because a contestant who might have set the record or won the race was handicapped by a bad start. Most races are started by a man appointed as the starter who gives spoken commands and manually fires a starting gun. The timing of these signals therefore varies greatly from one starter to another and even the same man, no matter how experienced he may be, can not always be consistent in the timing of his starting signals. Consequently, in any race started orally, there is high probability of one or more contestants either starting before the gun is fired or being not quite ready to start when the gun is fired. With the automatic starting device described herein, the signals are accurately timed and are, therefore, always the same. This device can be used in practice by all contestants as well as in a championship contest thus enabling all contestants to become accustomed to the timing of the starting signals. This gives each contestant a fair and equal chance to start at the exact instant the starting gun is fired.

It is, therefore, an object of this invention to provide an automatic device which speeds the running of various events during a track meet. By always providing consistently timed signals which the contestants can anticipate, most "fouls" or false starts are eliminated. This eliminates the time required for a second lining-up of the contestants and a second start. Also by eliminating false starts, the energy of the contestants is conserved for the race itself enabling each contestant to give his full ability in the race.

We accomplish the above object as well as others which will become apparent from the description given hereinafter, by automatically generating and timing detectable signals which are audible and readily understood by the contestants in any race. Our device also includes provisions for the generation of an additional signal which is automatically brought into action in case any of the contestants should illegally move across the starting line before the start of a race.

Other important advantages of our invention are that the device is small, compact and lightweight making it easily portable to various starting points. It is usable at any point on a race track and can even be used for "staggered" starts where the starting line runs diagonally across the track. Because of its ease of operation, it can be operated by an assistant thus relieving a highly expert race official from the duties of timing the starting signals and of calling back contestants who "jump the gun." This allows the official to concentrate fully on the other important details of his job assuring better and fairer races for all concerned. Also, when our device is used in practice, it can be operated by the runner himself, eliminating the need for an experienced starter and thus releasing the coach for other duties.

Other advantages and objects of our invention will become apparent by referring to the drawings in which.

Figure 5:
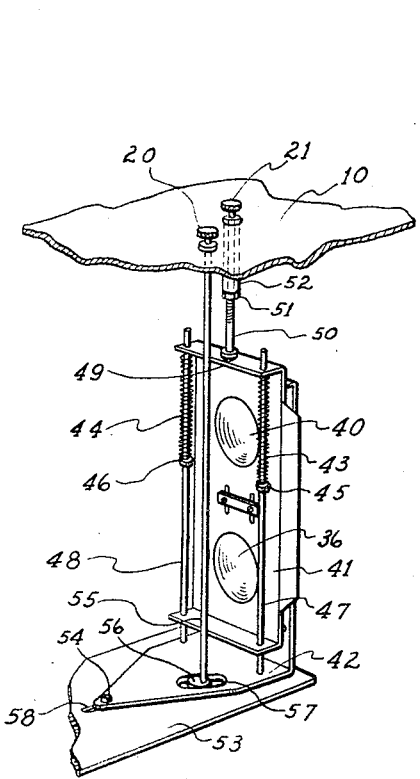
Figure 3:
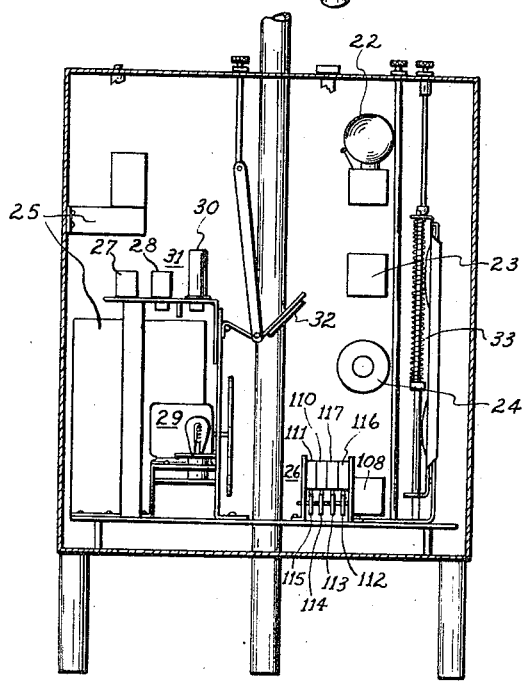
Figure 8:
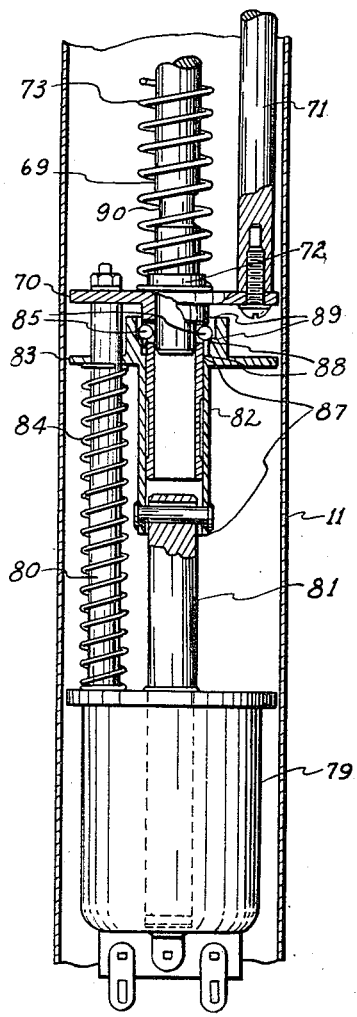
Figure 9:
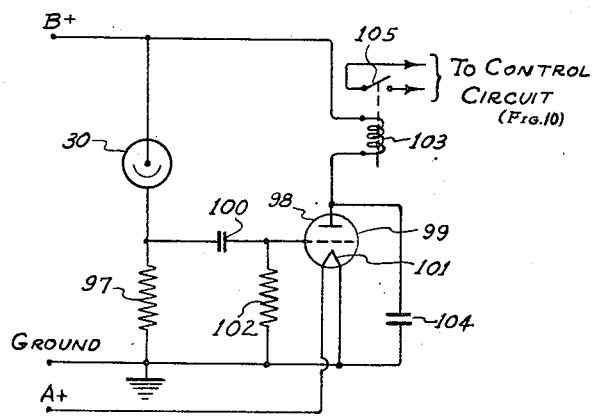
Figure 10:
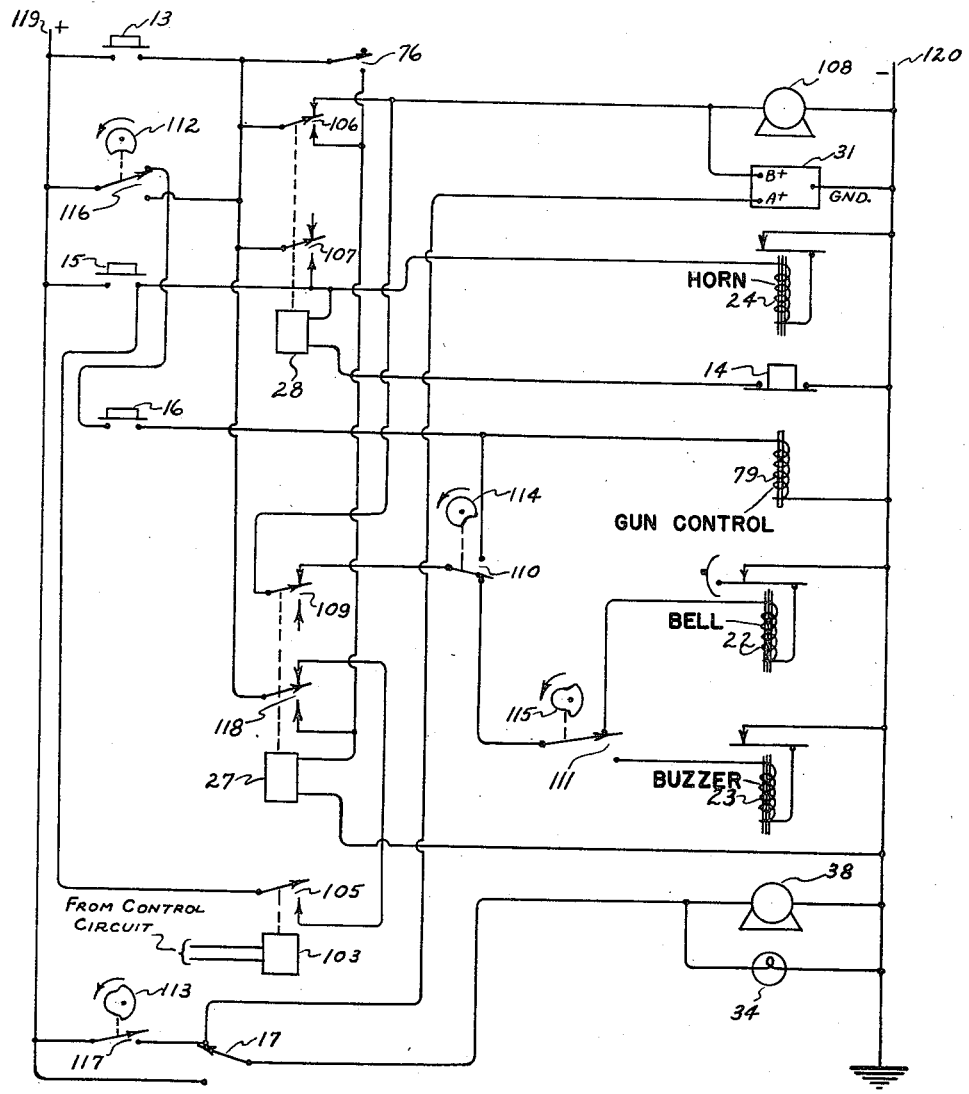

Figure 3 is a cross-sectional view in elevation of the control box showing the arrangement of the various signalling means, Figure 4 is a perspective view partly in cross-section illustrating photoelectric signalling and receiving means used for preventing a false start, Figure 5 is a detailed view of the lens arrangement which is part of the optical system, Figures 6 and 8 are details in elevation and cross-section of the gun firing mechanism, Figure 7 is a detail of the gun firing mechanism as viewed from the top, Figure 9 illustrates the electronic circuit for amplifying the signals received by the phototube, Figure 10 is the control and timing circuit.

Figure 1:
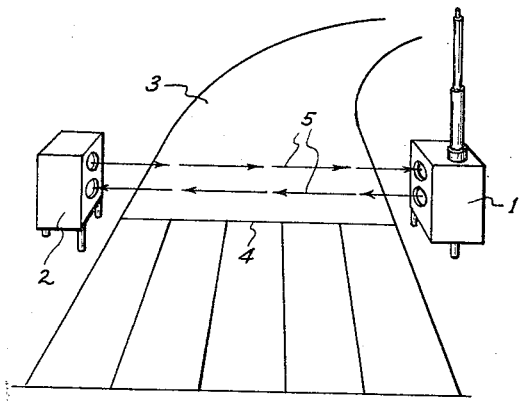
Figure 1 illustrates the positioning of the device in relation to a track.

The device, illustrated in Figure 1, consists of a control box 1, a mirror box 2, and a source of electrical power. When set up for use, the control box 1 is located on one side of the race track 3 and the mirror box 2 on the other. The control box is connected through wires to the source of electrical power which usually consists of a 6 volt storage battery. During the course of operation, a light beam 5, originating in the control box 1, is projected across the track, close to and parallel to the starting line 4, to the mirror box 2 which then reflects the light beam back to a light sensitive device in the control box 1.

In operation, the depressing of a start button by the operator initiates action of the device. Immediately upon starting, a bell begins to ring. This signal is comparable to the usual spoken command, "on your mark." The bell continues ringing for a period long enough to allow the contestants to get into position. At the end of this period, the bell stops ringing and a buzzer is energized to indicate the usual "get set" command. After an interval as specified by the contest rules, the buzzer stops and a gun is fired to indicate the exact starting time of the race. If, at any time after the "get set" buzzer sounds, and before the gun is fired, a contestant interrupts the light beam, a horn will blow indicating a "foul." A push button is provided for manually sounding the "foul" horn.

The mechanical construction of our invention will be described first. The control box 1, Figure 1, is illustrated in more detail in Figure 2. It is a steel box 6 supported on legs 7. Two holes are provided in the side of the box, the lower one 8 for the light beam which is projected across the race track and the upper one 9 for the image of the beam which is reflected back to the control box. The top surface of the box serves as the control panel 10. On it are mounted pushbuttons 13, 14, 15 and 16, switch 17, observation window 18, and knobs 19, 20 and 21. The functions of these controls are described later. A tube 11 extends upward from the box and carries the gun assembly 12. This tube is of telescoping construction so that the gun may be raised above observers standing nearby and thus protect against personal injury from the firing of the gun. This feature also places the gun in a position where it can be clearly seen by timers and other officials of the race.

Inside the control box, as shown in Figure 3, are mounted a bell 22, a buzzer 23, a horn 24, and power supply equipment 25. The signal timer 26, containing timing cams 112 through 115 inclusive, switches 110, 111, 116 and 117 and motor 108; relays 27 and 28; the light source and light beam chopper unit 29; the phototube 30 and amplifier assembly 31; the aligning mirror 32 and the lens assembly 33 are also included in the control box.

The parts in the control box 1 associated with the optical system and with the mirror box assembly 2 are shown in more detail in Figure 4. These parts are the light source and beam chopper unit 29, the lens assembly 33, the phototube and amplifier unit 31, the aligning mirror 32 and the mirror box 2. Light is generated in the electric lamp 34. A chopper disc 35 is interposed between lamp 34 and the lens 36. The chopper disc 35 contains evenly spaced holes 37 placed in a circle around the center of the disc 35 near the periphery of the disc. These holes 37 are so placed that as the disc is rotated by the chopper motor 38 they successively pass through a line between the filament 39 of the lamp 34 and the center of the lens 36. Thus, light from the lamp filament 39 passes to the lens 36 and out of the control box 1 only when a hole 37 in the chopper disc 35 is aligned between the lamp 34 and the lens 36.

Rapid rotation of the disc 35 then causes the light beam 5 leaving the control box 1 to turn on and off at a rapid rate.

The light beam 5 is thus chopped for the purpose of giving the light beam a pulsating characteristic which permits it to be a distinguished from other light which falls on the phototube 30. The amplifier circuit can then be made responsive only to rapidly pulsating light and thus it is not affected by other light falling on the phototube 30.

The lens assembly 33 is adjustable in three directions to provide for focusing and aiming the light beam 5. These adjustments are shown in detail in Figure 5. The two lenses 36 and 40 are fastened to the lens plate 41. The lens plate 41 is fastened to the lens assembly bracket 42 in such a manner that the lens plate 41 is free to move vertically relative to the bracket 42. Springs 43 and 44 are compressed between collars 45 and 46 respectively on guide rods 47 and 48 respectively and the upper flange 49 of the lens plate 41. Guide rods 47 and 48 bear at their lower ends against the lens assembly bracket 42 and thus the springs 43 and 44 tend to force the lens plate 41 upward against the vertical adjustment rod 50. The vertical adjustment rod 50 is threaded and its threads engage those of nut 51 which is fastened to the guide tube 52 which in turn is fastened to the control panel 10. The adjustment rod 50 extends through the guide tube 52 to the outside of the control panel 10 where a knob 21 is attached. The adjustment rod 50 can be screwed up or down through the nut 51 by turning the knob 21. As the adjustment rod 50 is screwed down, it forces the lens plate 41 downward against the force of springs 43 and 44. Screwing the rod upward releases the lens plate 41 and the force of springs 43 and 44 is allowed to move the lens plate 41 upward. As the lens 36 is thus moved upward and downward, the light beam 5 is aimed higher or lower.

The lens mounting bracket 42 is attached to the base plate 53 by a single bolt 54. The bracket 42 can rotate around this bolt 54 as a pivot. A shaft 55, carrying an eccentric cam 56 which engages a slot 57 in the lens bracket 42, is mounted between the base plate 53 and the control panel 10. As the upper end of the shaft 55 is rotated by turning knob 20, the eccentric cam 56 pushes against one or the other side of the slot 57 forcing the bracket 42 and the lenses 36 and 40 to pivot back and forth around the bolt 54. Thus as the shaft 55 is turned, the lenses 36 and 40 are moved sideways and, as the lenses 36 and 40 are moved sideways, the light beam 5 is directed to one side or the other.

Focusing of the image reflected to the phototube is accomplished by loosening the pivot bolt 54 and sliding the lens assembly bracket 42 relative to the base plate 53 in the direction of the slot 58 into which the pivot bolt 54 fits. The pivot bolt is provided with a shoulder so that it can be tightened relative to the base plate, fixing the focus adjustment, while leaving the lens bracket 42 free to oscillate around the pivot 54.

The mirror box 2, Figure 4, consists of a housing 91 provided with legs 92. In the front of the housing are two holes for passage of light. The light beam 5 from the control box 1 enters through the lower hole 93 and is reflected back to the control box through the upper hole 94. Inside the housing 91 is an assembly 95 of three plane mirrors each perpendicular to each of the others. In this manner, they are positioned relative to each other as are the three sides at a corner of a cube. The reflecting surfaces 96 of this cubical corner of mirrors are on the inside. With this arrangement a light beam striking one of the mirrors will always be reflected back by one of the other mirrors in a direction parallel to the incident beam but the reflected beam will be displaced from the incident beam by a distance depending on the point at which the incident beam strikes the first mirror. The mirrors are arranged relative to the holes 93 and 94 in the housing 91 such that whenever the light beam 5 from the control box is centered on the lower hole 93 in the mirror box and enters at approximately right angles to the plane of the holes 93 and 94 the reflected beam will pass through the upper hole 94 in the mirror box and fall on the upper hole 9 Figure 1 in the control box 1 Figure 1. Thus the only adjustment necessary to correctly align the two boxes after they have been set in approximately correct positions is to direct the light beam to the lower hole 93 in the mirror box. This mirror arrangement thus greatly facilitates the light beam adjustment required to correctly center the beam on the phototube.

To facilitate the aiming and focusing of the light beam 5, the alignment mirror 32 (Figure 4) is provided. This mirror 32 is hinged to its mounting bracket 59 and it is provided with a pull rod 60 which extends upward through the control panel 10. Knob 19 is attached to the upper end of rod 60. When the pull rod 60 is pulled upward, the mirror 32 swings into a position which intercepts the light beam 5 coming into the control box through the upper lens 40. The mirror 32 then reflects the light beam 5 upward toward the control panel 10. An observation hole 18 is provided in the control panel 10 for observing the mirror 32. The mirror 32 is so positioned that when it properly reflects the light beam 5 to the observation hole 18, it is indicated that the light beam is properly directed to the mirror box 2. Then, when the mirror 32 is allowed to drop, by releasing the pull rod 60, back into its normal position out of the path of the light beam, the light beam will fall correctly on the phototube 39 in the phototube amplifier unit 31.

The gun assembly 12 (Figure 2), which is mounted in the upper end of the gun tube 11, is shown in detail in Figures 6, 7 and 8. Refer first to Figure 6 which shows, in section, the upper portion of the gun assembly and to the top view in Figure 7. The entire assembly is mounted to the gun frame 61 which in turn is fastened to the gun tube 11. The cartridge holder 62 is attached to the gun frame 61 by a screw 63 which also acts as a pivot for the cartridge holder 62. When the cartridge holder 62 is closed, the ball 64 of spring catch 65 centers itself in a hole 66 in the gun frame 61 to hold the cartridge holder 62 closed. In this position, the cartridge chamber 67 is aligned with the bore of the gun barrel 68. Thus, by rotating the cartridge holder 62 about its pivot 63, the cartridge chamber 67 can be swung out of the gun frame 61. A blank cartridge can then be inserted and, when the cartridge holder 62 is again closed, the cartridge will be correctly positioned between the firing pin 69 and the barrel 68. As a safety measure, the cartridge chamber 67 is especially made so that only blank cartridges can be inserted.

The upper end of the firing pin 69 slides in a hole in the center of the gun frame 61. A guide plate 70 is rigidly fastened to the gun frame 61 by three supporting rods 71 (only one is shown for simplicity of drawing). The lower end of the firing pin 69 slides in a bearing sleeve 72 affixed to the guide plate 70. Spring 73, compressed between the guide plate 70 and the cocking arm 74 which is fastened to the firing pin 69, tends to force the firing pin 69 upward. The cocking arm 74 in its extreme upward position contacts the bottom surface of the gun frame 61 to limit the upward travel of the firing pin 69. In this extreme upward position, the tip 75 of the firing pin 69 protrudes into the cartridge chamber 67. Thus, when a cartridge is placed in the cartridge chamber 67 and the firing pin 69 is travelling upward toward the cartridge, the tip 75 of the firing pin 69 will contact the cartridge and cause it to fire or detonate just before the extreme upward position of the firing pin 69 is reached.

An electrical switch 76 is mounted on the gun frame. The contacts of this switch 76 are such that they open when the plunger 77 is released and close when the plunger 77 is depressed. An actuating arm 78 is fastened to the cocking arm 74 in such a position as to contact the switch plunger 77 when the firing pin 69 is near its upward position. This actuating arm 78 is of such a shape that as it slides upward over the plunger 77 the plunger will be depressed just before the firing pin 69 comes to rest in the upward position. The function of this switch is described with the electrical circuit later.

Refer now to the lower part of the gun assembly shown in Figure 8. A solenoid coil 79 which provides the force for releasing the firing pin 69 from its cocked position is rigidly mounted to the guide plate 70 by three supporting members 80 (only one is shown for simplicity of drawing). The armature 81 of the solenoid 79 is connected to the locking sleeve 82 which slides over the bearing sleeve 72 which in turn is fixed to the guide plate 70. A flange 83 on the locking sleeve 82 contains holes which slide over the solenoid supporting members 80. Springs 84 fit over the solenoid supporting members 80 and are compressed between the solenoid 79 and the flange 83 on the locking sleeve 82. Thus, these springs tend to force the locking sleeve 82 and the solenoid armature 81 upward. The bearing sleeve 72 contains two holes through which two balls 85 can roll radially from the firing pin 69. The balls 85 are restricted in movement on the inside of the bearing sleeve 72 by the firing pin 69 and on the outside by the locking sleeve 82. The locking sleeve 82 is bored so that three portions of its inner surface have three different diameters. One diameter 87 extending from the lower end up the greater portion of the length of the locking sleeve 82 is such as to provide a sliding fit over the bearing sleeve 72. The second diameter 88 extending a short distance farther toward the upper end of the locking sleeve 82 is slightly larger and is such that it will slide over the balls 85 only when they are moved to protrude a considerable distance into the bore of the bearing sleeve 72. The third bore diameter 89 at the upper end of the locking sleeve 82 is still larger such that, when the locking sleeve 82 is pulled downward and the balls 85 are moved radially outward and rest against the sleeve 82 at this diameter, the balls 85 will not protrude into the bore of the bearing sleeve 72. Thus, when the gun is cocked by manually moving the cocking arm 74 and firing pin 69 downward against the force of the firing spring 73, the balls 85 ride against the firing pin 69 until the firing pin 69 has been moved downward far enough to bring the groove 90 (which is cut in the firing pin), opposite the balls 85. At this point, the springs 84 force the locking sleeve 82 upward which in turn pushes the balls 85 inward so that they protrude into the groove 90 in the firing pin. With the balls 85 thus protruding, the locking sleeve 82 moves upward due to the force of springs 84 bringing the second bore 88 in the locking sleeve 82 up opposite the balls 85. This smaller bore 88 then prevents movement of balls 85 back out of the groove 90 in the firing pin. The balls 85 then obstruct the sliding of the firing pin 69 through the hole in the bearing sleeve 72 and thus they hold the firing pin 69 in the downward or cocked position.

When electrical power is applied to the solenoid 79, the armature 81 and the locking sleeve 82 are pulled downward. This movement of the locking sleeve 82 brings the largest bore diameter 89 in the locking sleeve 82 opposite the balls 85. The balls 85 can then be pushed outward as the firing pin 69 moves upward. The firing pin 69 is then free to be pushed upward by the spring 73. Thus, energization of the solenoid 79 releases the firing pin 69 and causes firing of the gun.

The electronic circuit of the phototube and amplifier unit 31 (Figures 3 and 4) is shown schematically in Figure 9. As described previously, a beam of light, pulsating in intensity, normally is directed onto the phototube 30. The phototube 30 is connected in series with a resistor 97 between a source of direct voltage having positive terminal B+ and a negative terminal at ground. The electrical resistance of a phototube varies inversely with the amount of light striking it and consequently the current flowing through the phototube 30 and the resistor 97 varies directly with the amount of light falling on the phototube 30. Since normally the light intensity is varying, this current through the phototube 30 will vary correspondingly and produce a correspondingly varying voltage at the junction between the phototube 30 and resistor 97. This varying voltage is transmitted to the control grid 98 of the amplifier tube 99 through a condenser 100. The filament or cathode 101 of the amplifier tube 99 is heated by the flow of electrical current from another power source having positive terminal A+ and negative terminal at ground.

Whenever the voltage on the control grid (98) is more positive than the voltage on the cathode 101, current will flow between grid 98 and cathode 101. Thus at the peak of the positive going signal a slight amount of grid current flows charging the coupling condenser 100 negatively on the grid end. This means that the positive pulsating voltage produced by the phototube will appear as pulsating negative voltage on the grid 98 of the amplifier 99. The condenser 100 does not charge and discharge appreciably through the grid resistor 102 when the pulsating light beam falls on the phototube because the electrical resistance of this resistor 102 is relatively high. Thus, considerably more time is required for charging and discharging of the condenser 100 through this resistor 102 than is allowed between the applied pulses of voltage.

Maximum current flows through the amplifier tube 99 when its control grid 98 voltage is maximum and the current decreases as the grid voltage goes negative with respect to the voltage on the cathode 101 (ground). Thus the negatively pulsating voltage applied to the control grid 98 causes a pulsating current to flow through the amplifier tube 99. The inductance of the relay coil 103 and the capacity of the condenser 104 connected across the tube tend to keep the current flowing through the relay coil 103 constant at a value which is an average of the maximum and minimum flowing in the amplifier tube and which is too small to operate the relay.

Now, when the light beam is interrupted and the pulsating light no longer falls on the phototube 30, the coupling condenser 100 then discharges through the resistors 102 and 97 and the voltage of the control grid 98 of the amplifier tube 99 rises to ground potential. The amplifier tube 99 then conducts a maximum of current steadily. This discharges the filter condenser 104 and this maximum current then flows through the relay coil 103 causing it to close a pair of normally open contacts 105 the function of which is described later.

The control circuit is illustrated in Figure 10. This diagram shows the electrical connections between the operating pushbuttons and switches, relays, the timer, and the various devices which are operated electrically. All switches as shown in this diagram are in their normal or "at rest" positions such as would be the case just before starting the device for operation.

The circuit is supplied by a source of electrical power having a positive terminal 119 and a negative terminal 120 which is grounded. Depressing the start pushbutton 13 applies power through contact 106 on relay 28 to the timing motor 108, to the B+ terminal of the amplifier unit 31, and further through contact 109 on relay 27 and contacts 110 and 111 on the timer unit 26 (Figure 3) to the bell 22. The bell 22, thus energized, begins to ring. The timer motor 108 then runs rotating the four timing cams 112, 113, 114 and 115 which are associated with switches 116, 117, 118 and 111 respectively. Since the A+ power to the phototube and amplifier unit 31 is not yet turned on, this unit 31 does not start operating immediately. Soon after the timer motor 108 begins to run, cam 112 operates switch 116. This switch 116 then shorts across the start pushbutton 13 permitting release of the pushbutton 13 without stopping operation of the device.

After the bell 22 has rung for almost its full period, during which time contestants are getting to their starting places, cam 113 operates switch 117. Power is then supplied through switch 117 to the A+ terminal of the phototube and amplifier unit 31, and also through switch 117 to the light source 34 and chopper motor 38. This turns on the light beam and the amplifier unit 31. The turning on of these devices is delayed as described to allow time for contestants or others to get out of the path of the light beam. This prevents obtaining a foul signal during the relatively long period during which the contestants are moving to their places.

Figure 2:
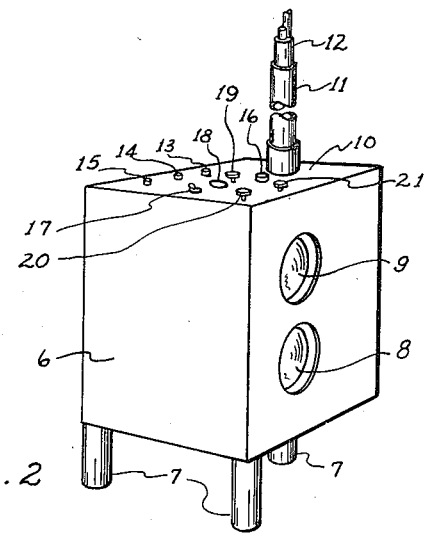
Figure 2 is a perspective view of the control box.

Next, cam 115 operates switch 111 which opens the circuit to the bell 22 and connects power to the buzzer 23. This causes the bell 22 to stop ringing and starts operation of the buzzer 23. The buzzer 23 then continues throughout the "get set" period until cam 114 operates switch 118 which then opens the circuit to switch 111 and the buzzer 22 and energizes the solenoid 79 in the gun assembly 12 (Figure 2). The gun solenoid 79 then causes firing of the gun as previously explained. Just as the gun is fired, switch 76 is closed by the upward position of the firing pin 69 (Figure 6) as described previously. Power is then supplied through switch 76 to the coil of relay 27 which in turn operates contacts 109 and 118.

Whenever a runner interrupts the light beam, while the phototube and amplifier unit is turned on, contact 105, which is operated by relay coil (103) in the phototube and amplifier circuit (Figure 9) will be operated. Thus when the gun is fired, contact 118, operated by relay coil 27 removes power from contact 105 so that operation of relay 103 by the interruption of the light beam by the runners will not then cause sounding of the foul signal 24.

As the cam motor 108 continues to run, cams 113, 114 and 115 will, soon after the firing of the gun, return switches 117, 110 and 111 respectively to their original positions. None of the signals will then be operated due to the open position of contact 109 operated, as described above, by relay coil 27. After all the cam switches are returned to normal, cam 112 releases switch 116 to its original position. This deenergizes and stops the cam motor 108, removes B+ power from the phototube and amplifier unit 31, and deenergizes relay coil 27 allowing contacts 109 and 118 to return to their normal positions. The unit is then completely reset, shut-off and ready for another operation.

As mentioned above, if the light beam is interrupted, the phototube and amplifier unit 31 will cause operation of relay coil 103 (Figure 9) which in turn operates contact 105. When this occurs while contact 118 is in its normal position (before the gun is fired), power will be conducted through switch 116, contact 118, and contact 105 to the "foul" horn 24 and also to relay coil 28. Sounding of the horn 24 then indicates that the light beam has been interrupted while energization of relay coil 28 causes operation of contacts 106 and 107. Contact 106 then opens the circuit to the cam motor 108 causing it to stop. Contact 106 also closes the circuit to relay coil 27 which in turn operates contacts 109 and 118. The other contact 107 operated by relay coil 28 closes a second circuit to the horn 24 and also to its own coil 28. Thus the horn sounds continually and relay coil 28 remains energized after contact 105 has returned to its normal position. The horn 24 will thus continue to sound until it is shut off by the operator. Pushbutton 14 is normally closed and thus completes the circuit to relay coil 28. Operation of this pushbutton 14 breaks the circuit to relay coil 28 which in turn restores contacts 106 and 107 to their original positions. When contact 106 is thus returned to its normal position, power is again applied to the timer motor 108 causing it to run until all cam switches 110, 111, 116, and 117 are again reset as previously described. Returning of contact 107 to its normal position opens the circuit to the "foul" horn 24 turning it off and also breaks the circuit from the power source plus terminal to relay coil 28. Contacts 109 and 118 operated by relay coil 27 remain in their operated positions as previously described until the timer cams 112, 113, 114, and 115 are reset. With contact 109 thus open, neither the bell 22, buzzer 23, nor the gun 79 will be operated during the resetting period. Also, with contact 118 in its operated position, relay coil 27 will be energized until switch 116 opens; and the power supply to contact 105 will be held open so that another interruption of the light beam while the timer motor 108 is resetting will not cause a second operation of the horn.

A pushbutton 15 is provided to allow the operator to sound the "foul" horn 24 at any time he may desire. This pushbutton 15, when operated, closes a circuit from the power source positive terminal directly to the horn 24. This also energizes relay coil 28. Thus, if the pushbutton 15 is operated while timer switch 116 is operated (during the course of operation of the device), the timing cycle will be stopped and other operations will occur just as they did when the horn 24 was energized by contact 105 due to interruption of the light beam as described above. Operation of pushbutton 15 at a time when the timer switch 116 is in its normal position will cause energization of relay coil 28 and associated operations; but, since switch 116 is in its normal position, power will not be conducted through contact 107 to the horn 24 and relay coil 28. Thus, in this case, the horn will remain energized only as long as pushbutton 15 is held closed.

Another pushbutton 16 is provided for manually energizing the gun solenoid 79 which results in firing the gun. Closing of this pushbutton 16 conducts power from the switch 116 directly to the solenoid 79 as long as switch 116 is in its normal position. Thus the gun can be fired manually only when the timer is reset. This prevents firing of the gun by accidentally touching pushbutton 16 while the timer is in operation. This feature allows firing of the gun to indicate the last lap of a long race as is the general practice.

A switch 17 is provided for use during the setting-up of the device. By operating this switch, the light source 34 and chopper motor 38 are turned on independently of the rest of the device. This facilitates aiming and adjusting of the light beam by keeping the light source on continuously without the sounding of any of the signals.

We claim:

An automatic starter for races comprising in combination three different audible signalling means and switching means for each connected therewith, an electric circuit connected with said signalling means having a source of power, separate timing means connected in said circuit to operate each of said switching means such that said signalling means are actuated in succession at different time intervals, a fourth audible signalling means connected through other switching means to said circuit and actuated when a false start is made comprising means projecting a beam of light across the starting line, means chopping said light thereby creating a pulsating beam, photoelectric means positioned to receive said light pulses, electronic means connected with said photoelectric means in said electric circuit responsive solely to an interruption of said pulsating light beam including relay means simultaneously actuating the switching means for the last actuated signalling means and thereby actuating said fourth signal means when a false start is made, and means for manually initiating and resetting the operation of said timing means, said switching means and said audible signalling means.

BOYD BRYAN LOVELESS.
RICHARD JACKSON ALHAND.
BASIL STAFFORD SAMPLE.

REFERENCES CITED

The following references are of record in the file of this patent:

UNITED STATES PATENTS

| Number | Name | Date |
|---|---|---|
| 2,322,936 | Hite | June 29, 1943 |